US009665151B1

(12) United States Patent
Zou et al.

(10) Patent No.: US 9,665,151 B1
(45) Date of Patent: May 30, 2017

(54) POWER OVER ETHERNET POWERED DEVICE INTERFACE WITH NON-POWER OVER ETHERNET SUPPLY DETECTION

(71) Applicant: Maxim Integrated Products, Inc., San Jose, CA (US)

(72) Inventors: Gaoling Zou, San Jose, CA (US); Thong A. Huynh, Fremont, CA (US); Mauro Ranzato, Torre d'Isola (IT); Andrea Vigna, Casanova Lonati (IT); Gianluca Mariano, San Martino Siccomario (IT)

(73) Assignee: Maxim Integrated Products, Inc., San Jose, CA (US)

( * ) Notice: Subject to any disclaimer, the term of this patent is extended or adjusted under 35 U.S.C. 154(b) by 352 days.

(21) Appl. No.: 14/036,242

(22) Filed: Sep. 25, 2013

Related U.S. Application Data

(60) Provisional application No. 61/706,226, filed on Sep. 27, 2012, provisional application No. 61/782,816, filed on Mar. 14, 2013.

(51) Int. Cl.
*G06F 1/28* (2006.01)
*G06F 1/26* (2006.01)

(52) U.S. Cl.
CPC . *G06F 1/28* (2013.01); *G06F 1/26* (2013.01)

(58) Field of Classification Search
CPC ... G06F 1/26; G06F 1/28; G06F 1/263; H04L 12/64
See application file for complete search history.

(56) References Cited

U.S. PATENT DOCUMENTS

2012/0303981 A1* 11/2012 Heath ............... H02J 1/108
713/300

OTHER PUBLICATIONS

IEEE Standards 802.3af, IEEE standard for information technology—Telecommunications and information exchange between systems—Local and metropolitan area networks—Specific requirements, Jun. 18, 2003, IEEE, pp. 1-55.*
Maxim Integrated Products, Inc., IEEE 802.3af PD Interface Controller for Power-Over-Ethernet, 19-2991, Rev. 2; Feb. 2006, pp. 1-14.

* cited by examiner

*Primary Examiner* — Kim Huynh
*Assistant Examiner* — Siamak S Hefazi
(74) *Attorney, Agent, or Firm* — Advent, LLP

(57) ABSTRACT

A method for detecting and classifying powered devices in power over Ethernet/non-power over Ethernet applications is described. In one or more implementations, the method includes deactivating a non-power over Ethernet component for a predetermined time period. The method also includes activating an isolation switch of a powered device after the predetermined time period has elapsed since no characteristic impedance associated with the powered device has been detected.

15 Claims, 5 Drawing Sheets

POWER OVER ETHERNET POWERED DEVICE INTERFACE WITH NON-POWER OVER ETHERNET SUPPLY DETECTION

CROSS-REFERENCE TO RELATED APPLICATIONS

The present application claims the benefit under 35 U.S.C. §119(e) of U.S. Provisional Application Ser. No. 61/706,226, entitled "Power Over Ethernet Powered Device Interface With Non-Power Over Ethernet Supply Detection," filed on Sep. 27, 2012 and U.S. Provisional Application Ser. No. 61/782,816, entitled "Power Over Ethernet Powered Device Interface With Non-Power Over Ethernet Supply Detection," filed on Mar. 14, 2013. U.S. Provisional Application Ser. Nos. 61/706,226 and 61/782,816 herein incorporated by reference in its entirety.

BACKGROUND

Power over Ethernet (PoE) technology describes passing electrical power, along with data, on Ethernet cabling. PoE technology is typically regulated by multiple IEEE standards. Power is supplied in common mode over two or more of the differential pairs of wires found in the Ethernet cables and comes from a power supply within a PoE-enabled networking device such as an Ethernet switch, or can be injected into a cable run with a midspan power supply. The basic elements of a PoE system are: 1) Power Sourcing Equipment (PSE), a device such as a switch that provides ("sources") power on the Ethernet cable, and 2) a powered device (PD) powered by a PSE that consumes energy from the Power Sourcing Equipment (PSE). Examples of powered devices include wireless access points, Internet Protocol (IP) telephones, and IP cameras.

SUMMARY

A system for detecting and classifying powered devices in power over Ethernet/non-power over Ethernet applications is described. In an implementation, the system includes a powered device having an integrated powered device controller with a non-power over Ethernet voltage detection circuit configured to support low voltage input and a time delay circuit configured to provide a delay time for the non-power over Ethernet voltage detection circuit to detect voltage to the system.

A method for detecting and classifying powered devices in power over Ethernet/non-power over Ethernet applications is described. In one or more implementations, the method includes detecting a non-power over Ethernet voltage using a non-power over Ethernet voltage detection circuit in an integrated powered device controller, the non-power over Ethernet voltage supplied to a powered device and activating an isolation switch of the powered device using a time delay circuit after a predetermined time period has elapsed since no characteristic impedance associated with the powered device has been detected, wherein the non-power over Ethernet component exhibits a characteristic impedance configured not to interfere with the powered device detection and classification signature.

A method for detecting and classifying powered devices in power over Ethernet/non-power over Ethernet applications is described. In one or more implementations, the method includes deactivating a non-power over Ethernet component for a predetermined time period using an integrated powered device controller having a non-power over Ethernet voltage detection circuit, the non-power over Ethernet component connected in a power over Ethernet network environment and activating an isolation switch of a powered device using a time delay circuit in the integrated powered device controller after the predetermined time period has elapsed since no characteristic impedance associated with the powered device has been detected, wherein the non-power over Ethernet component exhibits a characteristic impedance configured not to interfere with the powered device detection and classification signature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Power over Ethernet networks are configured to provide power, as well as data, to a powered device through Ethernet cables. Ethernet cables include modular connectors that interface with the powered devices, which furnish an electrical connection between the network and the powered devices.

Figure 1:
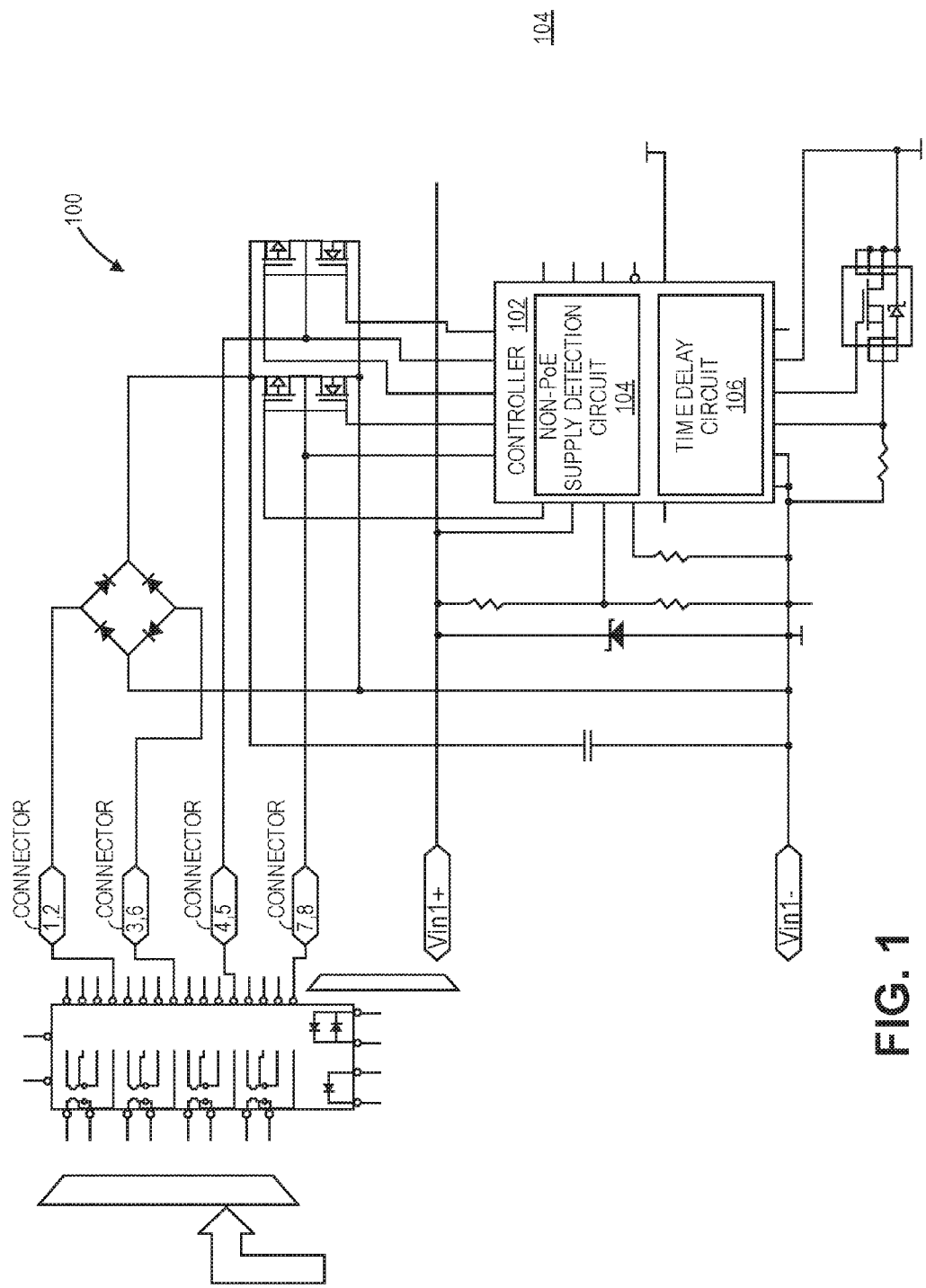
FIG. 1 is a diagrammatic illustration of PoE/Non-PoE power supply circuitry in accordance with an example implementation of the present disclosure.

To provide multiple power sources in a power over Ethernet (PoE) network environment, Non-PoE power supply techniques can be used in PoE powered device (PD) applications, such as Internet protocol (IP) phones, IP cameras, and so forth. Typical power supplies for these applications include a wall adapter or a battery of twelve volts (12V), twenty-four volts (24V), forty-eight volts (48V), and so forth. For example, twelve volt (12V) wall adapters are typically used due to cost considerations. In some instances, e.g., to save space and/or simplify IP phone design, a wall adapter input can be included in an RJ45 connector of, for instance, an IP phone. Thus, supplies that can be provided to an RJ45 connector include PoE supplies, Non-PoE supplies, or both PoE supplies and Non-PoE supplies. In these configurations, there are two inputs provided by a specialized Ethernet cable, e.g., a cable having additional wires from a Non-PoE supply connected to an RJ45 connector, for example 4,5-7,8 as illustrated in FIG. 1, which depicts an RJ45 PoE/Non-PoE application.

Figure 2:
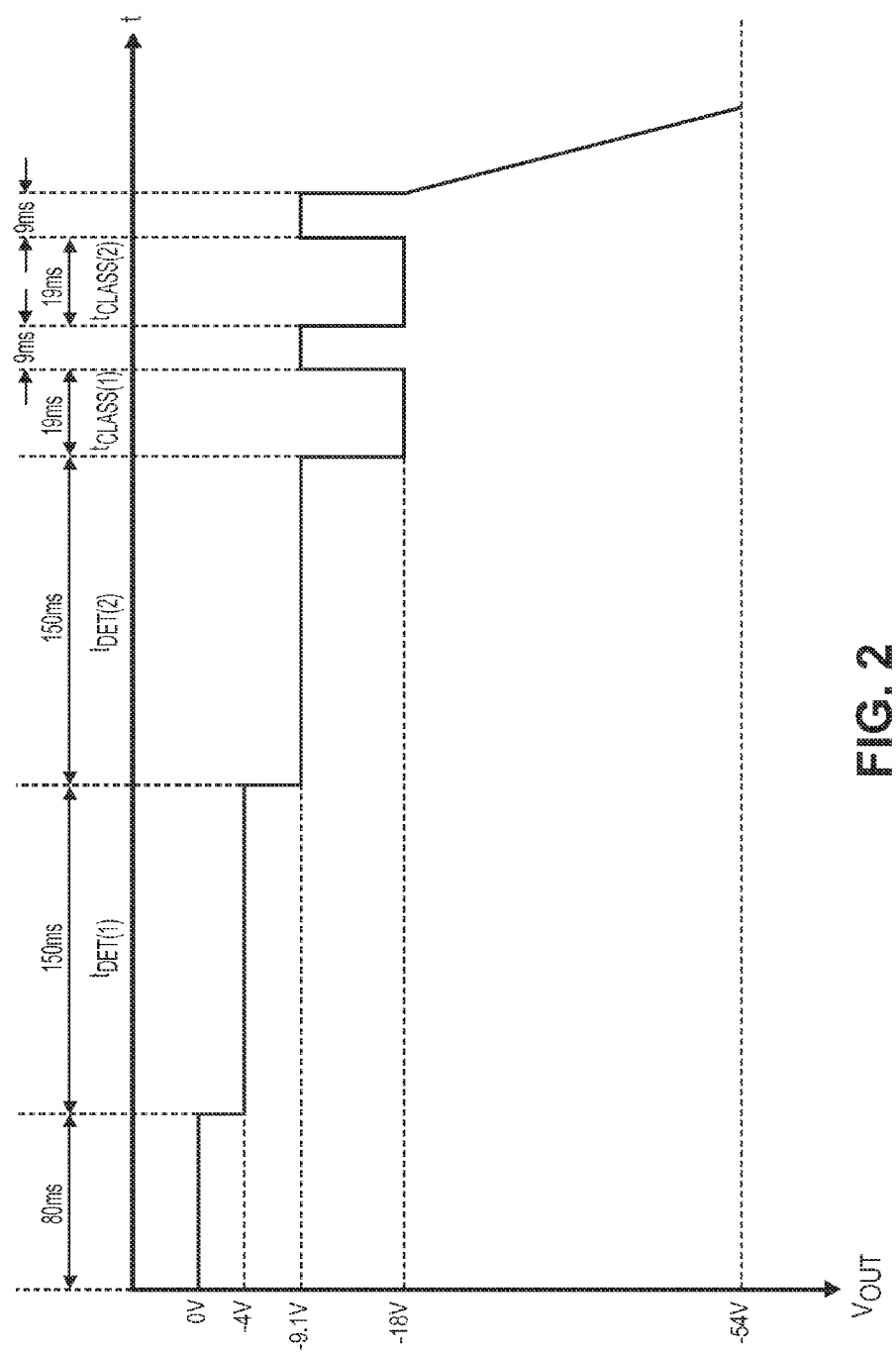
FIG. 2 is a diagrammatic illustration of power detection and classification for PoE applications in accordance with an example implementation of the present disclosure.

In many instances, the output of a 12V supply can vary within a certain range, e.g., from about ten volts (10V) to about sixteen volts (16V). However, PoE equipment typically has a detection voltage range from about negative one and forty-six one-hundredths volts (−1.46V) to about negative ten and one-tenth volts (−10.1V) and a classification voltage range from about negative fourteen and five-tenths volts (−14.5V) to about negative twenty and five-tenths volts (−20.5V) (e.g., as illustrated in FIG. 2). After the input bridge rectifier of a powered device (PD), the detection voltage range and the classification voltage ranges can become from about one and forty-six one-hundredths volts (1.46V) to about ten and one-tenth volts (10.1V) and from about fourteen and five tenths volts (14.5V) to about twenty and five-tenths volts (20.5V), respectively. Thus, a range such as from about ten volts (10V) to about sixteen volts (16V) from a RJ45 Non-PoE supply can interfere with detection and classification voltages of PoE equipment. Further, it should be noted that with diode bridge configurations, the input voltage detection range can be lower than about nine volts (9V). Thus, typical powered device controllers may not be able to detect and/or support low input voltage from Non-PoE power supply equipment, such as RJ45 connectors.

Accordingly, techniques are described for detecting and classifying powered devices in power over Ethernet and non-power over Ethernet applications. In one or more implementations, a method includes deactivating a non-power over Ethernet component for a predetermined time period. The method also includes activating an isolation switch of a powered device after the predetermined time period has elapsed as no characteristic impedance associated with the powered device has been detected.

Example Implementations

Referring generally to FIGS. 1 and 2, a method includes deactivating a non-power over Ethernet component (e.g., an RJ45 Non-PoE Supply detection circuit 104) for a predetermined time period (delay time). The delay time allows the PoE equipment to start up with a higher priority. As shown in FIG. 2, as per the IEEE802.3af/3at standard, a powered device (PD) 100 can have up to nine hundred milliseconds (900 ms) to power up after the detection starts. The method may also include detecting whether the powered device includes a characteristic impedance and classifying the powered device based upon a current draw when the characteristic impedance is detected. For example, during the delay, the powered device (PD) 100 can exhibit a high impedance so that the twenty-five and five-tenths kilo-Ohm (25.5 k Ohm) signature can be correctly detected by the PSE. The method further includes activating an isolation switch of the powered device after the predetermined time period has elapsed since no powered device (PD) characteristic impedance has been detected. For example, if no PoE equipment is available, the isolation switch of the powered device (PD) 100 can be activated (e.g., turned on) after the delay times out. In embodiments, the non-power over Ethernet component exhibits a characteristic impedance configured not to interfere with the powered device detection and classification signature (e.g., a high impedance). Instrumentation used for the techniques of the present disclosure can include an integrated powered device controller 102, which can further include a voltage detection circuit 104 (e.g., a non-power over Ethernet voltage detection circuit) that is able to support low input voltage and a time delay circuit 106.

Figure 3:
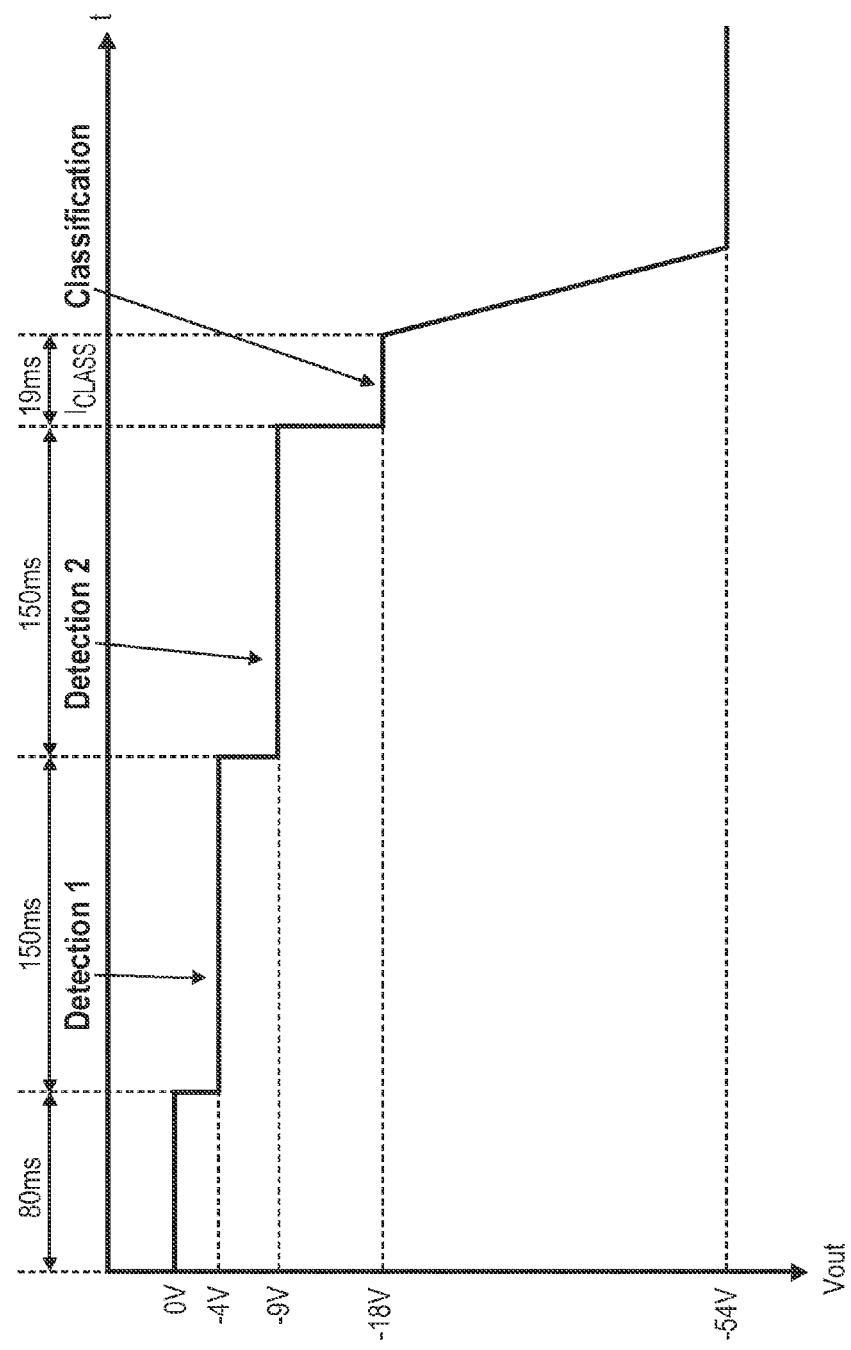
FIG. 3 is a diagrammatic illustration of power detection and classification for PoE applications in accordance with an example implementation of the present disclosure.

In an embodiment and as illustrated in FIG. 3, Power Sourcing Equipment (PSE) probes the output with two level voltages (−1V~−10.1V) for a valid powered device (PD) 100. A valid powered device (PD) 100 has a 25 kΩ discovery signature characteristic as specified in the IEEE 802.3at/af standard. During classification, Power Sourcing Equipment (PSE) forces a probe voltage between −12.5V and −20.5V at powered device (PD) 100 measures the current into powered device (PD) 100 to classify the powered device (PD) 100. For 12V adaptor, the Non-PoE supply range is 10V-16V. It interferes with rectified voltages of detection and classification.

Figure 4:
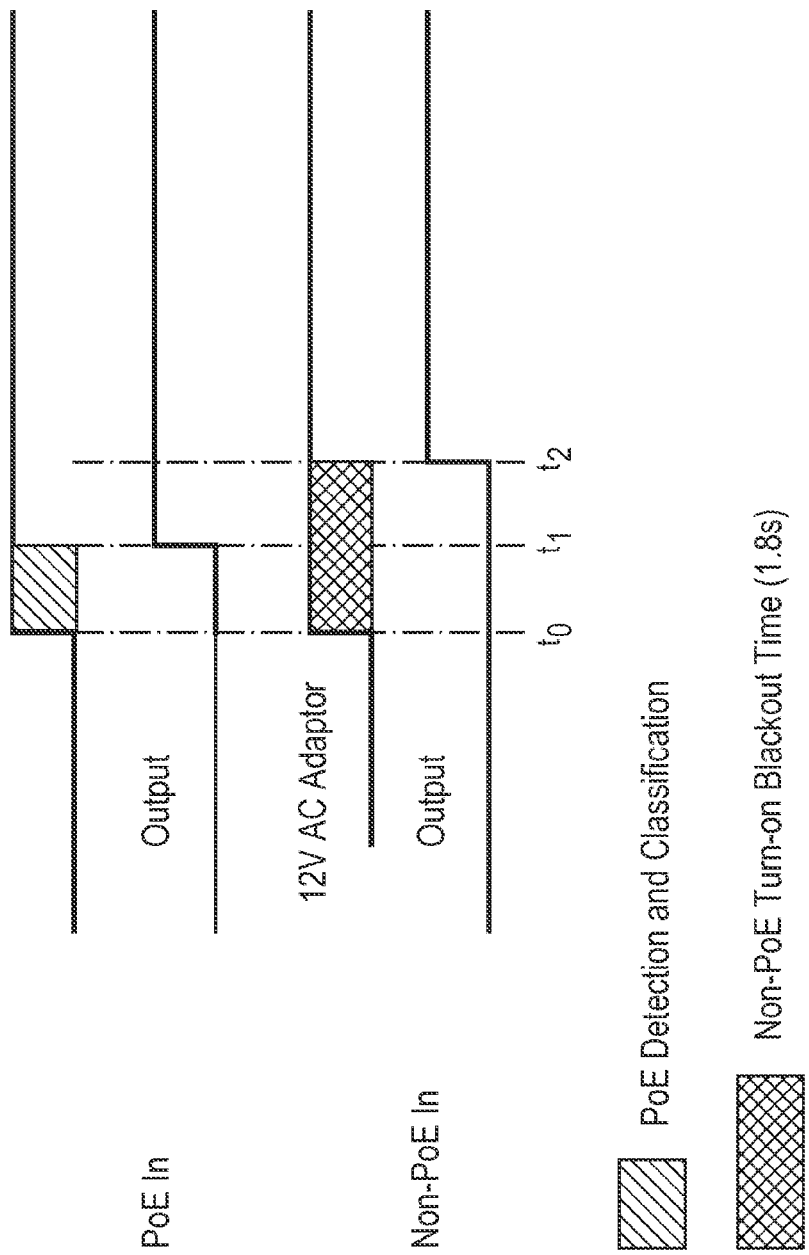
FIG. 4 is a diagrammatic illustration of power detection and classification for PoE applications in accordance with an example implementation of the present disclosure.

In another exemplary method and as illustrated in FIG. 4, a Non-PoE Turn-on Blackout Time should be greater than the time of PoE detection and classification. The system should be able to detect a voltage lower than 10V. Additionally, the supply current of the circuit should be less than 10 μA in detection voltage range.

The system provides for a Non-PoE Supply Detection with super low quiescent current circuitries of voltage detection and timer. The method provides a method of integration of Non-PoE Supply Detection circuitry into the powered device (PD) interface controller 102 to save space and cost.

Example Methods

Figure 5:
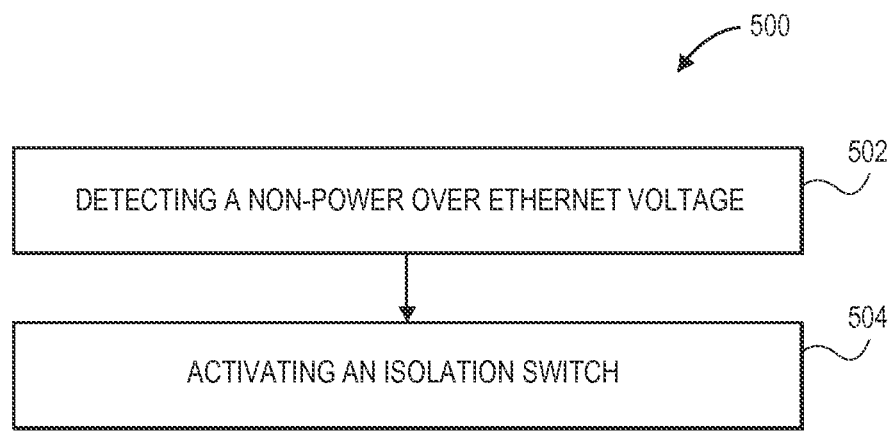
FIG. 5 is a flow diagram illustrating a process in an example implementation for detecting and classifying powered devices in power over Ethernet/non-power over Ethernet applications, such as the active bridge system shown in FIGS. 1 through 3.

FIG. 5 illustrates an example process 500 that employs an integrated powered device controller for detecting and classifying powered devices in power over Ethernet/non-power over Ethernet applications, such as the powered device 100 having an integrated powered device controller shown in FIG. 1. As illustrated in FIG. 5, a non-power over Ethernet voltage is detected using a non-power over Ethernet voltage detection circuit in an integrated powered device controller, the non-power over Ethernet voltage supplied to a powered device (Block 502) and an isolation switch of the powered device is activated (Block 504) using a time delay circuit after a predetermined time period has elapsed since no characteristic impedance associated with the powered device has been detected, wherein the non-power over Ethernet component exhibits a characteristic impedance configured not to interfere with the powered device detection and classification signature.

Figure 6:
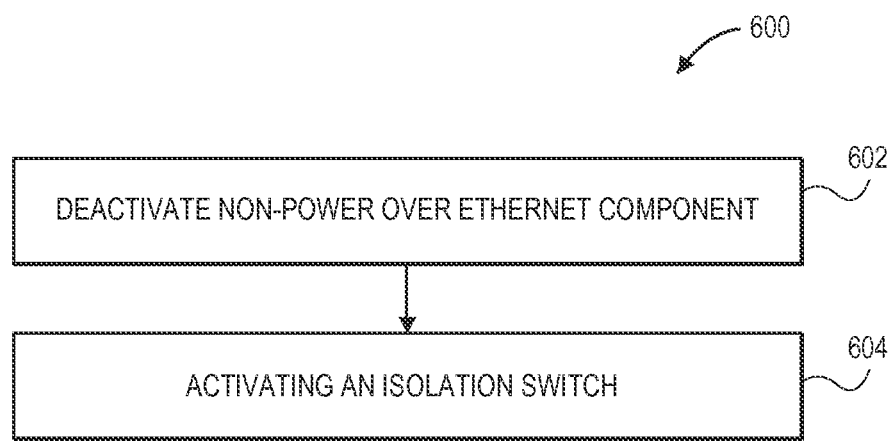
FIG. 6 is a flow diagram illustrating a process in an example implementation for detecting and classifying powered devices in power over Ethernet/non-power over Ethernet applications, such as the active bridge system shown in FIGS. 1 through 3.

FIG. 6 illustrates an example process 700 that employs an integrated powered device controller for detecting and classifying powered devices in power over Ethernet/non-power over Ethernet applications, such as the powered device 100 having an integrated powered device controller shown in FIG. 1. As illustrated in FIG. 6, a non-power over Ethernet component is deactivated for a predetermined time period using an integrated powered device controller having a non-power over Ethernet voltage detection circuit, the non-power over Ethernet component connected in a power over Ethernet network environment (Block 602), and an isolation switch of a powered device is activated using a time delay circuit in the integrated powered device controller after the predetermined time period has elapsed since no characteristic impedance associated with the powered device has been detected, wherein the non-power over Ethernet component exhibits a characteristic impedance configured not to interfere with the powered device detection and classification signature (Block 604).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a powered device having an integrated powered device controller, the powered device comprising an interface configured to electrically couple to a power over Ethernet component and a non-power over Ethernet component, the powered device including
      a non-power over Ethernet voltage detection circuit configured to support low input voltage over the interface;
      a time delay circuit configured to provide a delay time for the non-power over Ethernet voltage detection circuit to detect voltage to the powered device over the interface; and
      an isolation switch operatively coupled to the time delay circuit, the time delay circuit configured to cause the isolation switch to transition to an on configuration after the delay time has elapsed when no characteristic impedance associated with the powered device has been detected over the interface,
      wherein the time delay circuit is configured to allow power over Ethernet to start up with higher priority during the predetermined time period when the integrated powered device controller detects a characteristic impedance corresponding to the powered device over the interface and the integrated powered device controller classifies the powered device based upon a current draw corresponding to the powered device when the characteristic impedance is detected.

2. The system of claim 1, wherein the integrated powered device controller has up to 900 ms to power up after voltage detection by the non-power over Ethernet voltage detection circuit starts.

3. The system of claim 1, wherein the integrated powered device controller exhibits high impedance so that an approximately 25.5 kohm signature is correctly detected by power sourcing equipment.

4. The system of claim 1, wherein the non-power over Ethernet voltage detection circuit is configured to detect a voltage lower than 10 volts.

5. The system of claim 1, wherein the non-power over Ethernet voltage detection circuit is configured to detect current less than 10 µA.

6. A method, comprising:
   detecting a non-power over Ethernet voltage using a non-power over Ethernet voltage detection circuit in an integrated powered device controller, the powered device comprising an interface an interface configured to electrically couple to a power over Ethernet component and a non-power over Ethernet component, the non-power over Ethernet voltage supplied to a powered device over the interface; and
   activating an isolation switch of the powered device using a time delay circuit after a predetermined time period has elapsed when no characteristic impedance associated with the powered device has been detected over the interface, wherein the non-power over Ethernet component exhibits a characteristic impedance configured not to interfere with the powered device detection and classification signature,
   wherein the time delay circuit is configured to allow power over Ethernet to start up with higher priority during the predetermined time period when the integrated powered device controller detects a characteristic impedance corresponding to the powered device over the interface and the integrated powered device controller classifies the powered device based upon a current draw corresponding to the powered device when the characteristic impedance is detected.

7. The method of claim 6, wherein the integrated powered device controller has up to 900 ms to power up after voltage detection by the non-power over Ethernet voltage detection circuit starts.

8. The method of claim 6, wherein the integrated powered device controller exhibits high impedance so that an approximately 25.5 kohm signature is correctly detected by power sourcing equipment.

9. The method of claim 6, wherein the non-power over Ethernet voltage detection circuit is configured to detect a voltage lower than 10 volts.

10. The method of claim 6, wherein the non-power over Ethernet voltage detection circuit is configured to detect current less than 10 µA.

11. A method, comprising:
    deactivating a non-power over Ethernet component for a predetermined time period using an integrated powered device controller having a non-power over Ethernet voltage detection circuit, the non-power over Ethernet component connected in a power over Ethernet network environment, the integrated powered device controller disposed within a powered device, the powered device comprising an interface electrically connected to the non-power over Ethernet component and a power over Ethernet component; and
    activating an isolation switch of a powered device using a time delay circuit in the integrated powered device controller after the predetermined time period has elapsed when no characteristic impedance associated with the powered device has been detected over the interface, wherein the non-power over Ethernet component exhibits a characteristic impedance configured not to interfere with the powered device detection and classification signature,
    wherein the time delay circuit is configured to allow power over Ethernet to start up with higher priority during the predetermined time period when the integrated powered device controller detects a characteristic impedance corresponding to the powered device over the interface and the integrated powered device controller classifies the powered device based upon a current draw corresponding to the powered device when the characteristic impedance is detected.

12. The method of claim 11, wherein the integrated powered device controller has up to 900 ms to power up after voltage detection by the non-power over Ethernet voltage detection circuit starts.

13. The method of claim 11, wherein the integrated powered device controller exhibits high impedance so that an approximately 25.5 kohm signature is correctly detected by power sourcing equipment.

14. The method of claim 11, wherein the non-power over Ethernet voltage detection circuit is configured to detect a voltage lower than 10 volts.

15. The method of claim 11, wherein the non-power over Ethernet voltage detection circuit is configured to detect current less than 10 µA.

* * * * *